US008924969B2

(12) United States Patent
Khutornenko et al.

(10) Patent No.: US 8,924,969 B2
(45) Date of Patent: Dec. 30, 2014

(54) VIRTUAL MACHINE IMAGE WRITE LEASING

(75) Inventors: Maxim Khutornenko, San Jose, CA (US); Corey M. Sanders, Seattle, WA (US); Karthik Raman, Issaquah, WA (US); Pavel A. Dournov, Sammamish, WA (US); Saad Syed, Redmond, WA (US); Andrew James Edwards, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 13/491,423

(22) Filed: Jun. 7, 2012

(65) Prior Publication Data

US 2013/0332921 A1  Dec. 12, 2013

(51) Int. Cl.
*G06F 9/455* (2006.01)

(52) U.S. Cl.
USPC .......................................................... 718/1

(58) Field of Classification Search
None
See application file for complete search history.

(56) References Cited

U.S. PATENT DOCUMENTS

| 2009/0210873 | A1 | 8/2009 | Cuomo et al. |
| 2010/0042672 | A1 | 2/2010 | Lo et al. |
| 2010/0192143 | A1 | 7/2010 | Ingle et al. |
| 2011/0119668 | A1* | 5/2011 | Calder et al. ................ 718/1 |
| 2011/0161952 | A1 | 6/2011 | Poddar et al. |
| 2011/0265082 | A1 | 10/2011 | Ashok et al. |
| 2013/0061219 | A1* | 3/2013 | Jerbi et al. .................. 718/1 |

OTHER PUBLICATIONS

"The VMware Reference Architecture for Stateless Virtual Desktops on Local Solid-State Storage with VMware View 4.5", Retrieved on: Mar. 16, 2012, Available at: http://www.vmware.com/files/pdf/VMware-View-45-Stateless-RA.pdf.
Peng, et al., "VDN: Virtual Machine Image Distribution Network for Cloud Data Centers", Retrieved on: Mar. 19, 2012, Available at: http://www.cs.ucla.edu/~chunyip/publications/infocom12-vdn-peng.pdf.

* cited by examiner

*Primary Examiner* — Gregory A Kessler
(74) *Attorney, Agent, or Firm* — Ben Tabor; David Andrews; Micky Minhas

(57) ABSTRACT

A system that includes multiple hosts, each having physical resources, a hypervisor, and a host agent that causes the virtual machines to operate above the hypervisor so as to be abstracted from the physical resources. A host fabric reviews requests to instantiate or upgrade a virtual machine, identifies a corresponding virtual machine image to instantiate the virtual machine from in order to honor the request, and determines whether the virtual machine to be instantiated has a valid lease on the virtual machine image. If the requestor does not have a valid lease, the request is blocked. If the requestor does have a valid lease, the host fabric facilitates the instantiation of the virtual machine from the virtual machine image. This prevents or eliminates the chances of multiple instances of the same virtual machine image writing to the virtual machine image at the same time.

23 Claims, 7 Drawing Sheets

VIRTUAL MACHINE IMAGE WRITE LEASING

BACKGROUND

The virtualization of computing systems has enabled the flexible and convenient setup and maintenance of computing systems. A computing system is virtualized by having a virtual machine operate remotely from the client computing system that the virtual machine serves. The virtual machine emulates the logic of a fully operational computing system including the operating system, its various applications, and corresponding settings, and interfaces with the user via a remotely located client computing system. For instance, the virtual machine receives client input from the remote client, and provides resulting desktop image information back to the client. The client does not operate the corresponding operating system, but rather just receives the user input, and renders the desktop using the resulting desktop image provided by the virtual machine.

The virtual machine operates on a host computing system (also referred to in the art as a "host" or "node" in the technical art of virtualization). The host typically operates many other virtual machines. The hardware used by the virtual machine is also often on the host, including processing resources, storage, network, memory, and so forth. Each virtual machine maintains the proper emulation of an isolated computing system by interfacing with the available hardware through a hypervisor. Furthermore, virtualization software can redirect input/output (I/O) calls from the virtual machine to a remote storage service thus virtualizing the storage resource provided by the remote storage service.

BRIEF SUMMARY

At least one embodiment described herein relates to a system that includes multiple hosts, each having physical resources, a hypervisor, and a host agent that causes the virtual machines to operate above the hypervisor so as to be abstracted from the physical resources. Furthermore, a host fabric reviews requests to instantiate a virtual machine, identifies a corresponding virtual machine image to instantiate the virtual machine in order to honor the request, and determines whether the virtual machine to be instantiated has a valid lease on the virtual machine image. In some embodiments, the host fabric may, for example, manage the provisioning and lifecycle management of all resources in the system. If the requestor does not have a valid lease, the request is blocked. If the requestor does have a valid lease, the host fabric facilitates the instantiation of the virtual machine from the virtual machine image. This prevents or eliminates the chances of multiple instances of the same virtual machine image writing to the virtual machine image at the same time. This can happen, for example, during virtual machine migration across hosts during automatic service recovery or virtual machine resource configuration change. This might also occur if the host fabric were to experience a state loss of the fabric controller or backup state restoration.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with the embodiments described herein, a system includes multiple hosts, each having physical resources, a hypervisor, and a host agent that causes the virtual machines to operate above the hypervisor so as to be abstracted from the physical resources. Furthermore, a host fabric reviews requests to instantiate (or upgrade) a virtual machine, identifies a corresponding virtual machine image to instantiate (or upgrade) the virtual machine in order to honor the request, and determines whether the virtual machine to be instantiated (or upgraded) has a valid lease on the virtual machine image. In this description and in the claims, a "lease" is broadly defined as any mechanism that guarantees exclusive access to a resource corresponding to the lease. For example, a lease may be a mutex, lock, or a lease. If the requestor does not have a valid lease, the request is blocked. That is to say, if the requestor is not the same as the entity to which the mechanism guarantees exclusive access, the request is blocked. If the requestor does have a valid lease, the host fabric agent facilitates the instantiation or upgrading of the virtual machine from the virtual machine image. In addition or alternatively, the system may include multiple component systems. In that case, the system enforces that only at most one of the component systems may write to the virtual machine image at a time. This prevents or eliminates the chances of multiple instances of the same virtual machine image writing to the virtual machine image at the same time. First, some introductory discussion regarding computing systems will be described with respect to FIG. 1. Then, embodiments of the system will be described with respect to FIGS. 2 through 7.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
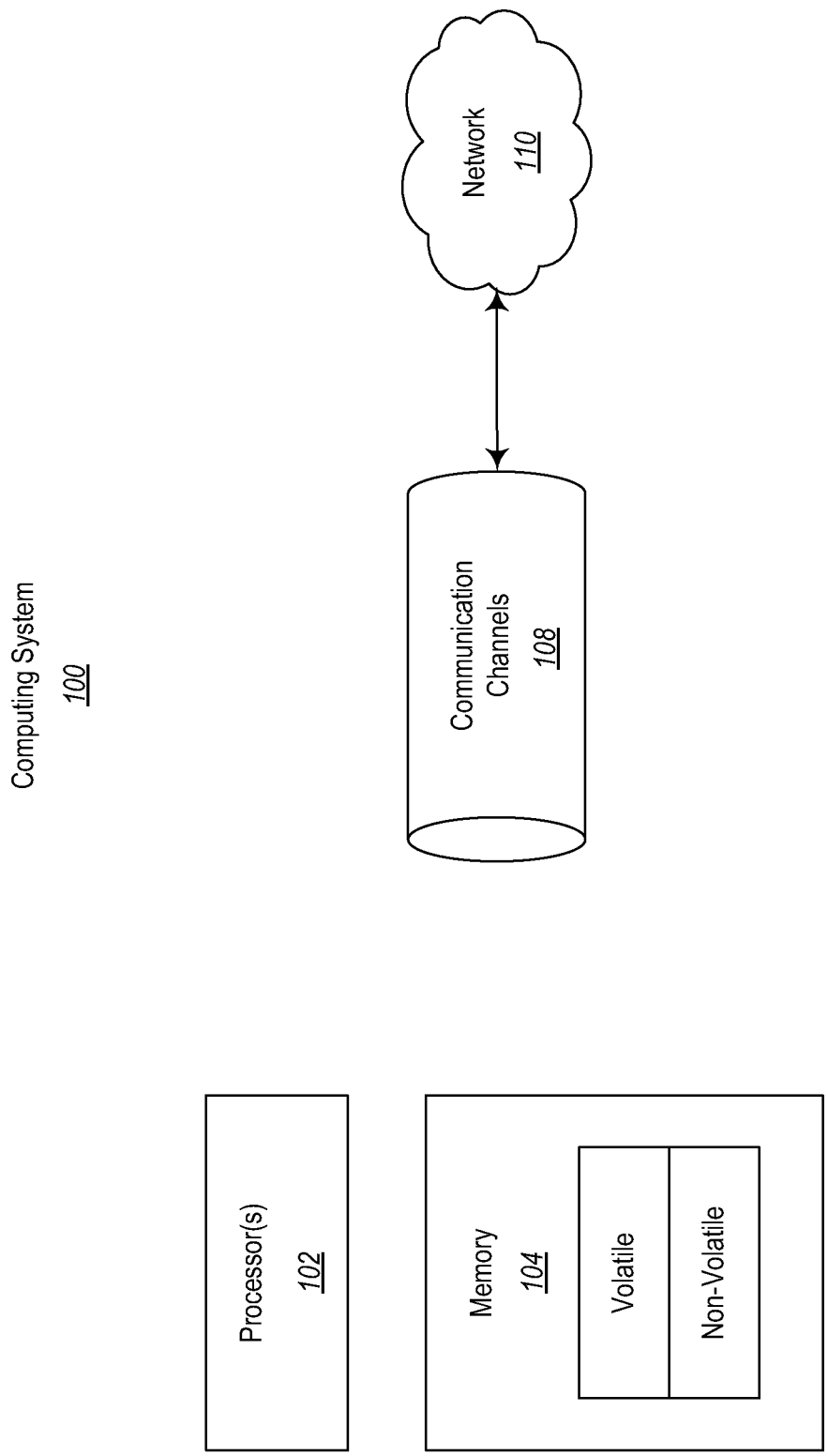
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
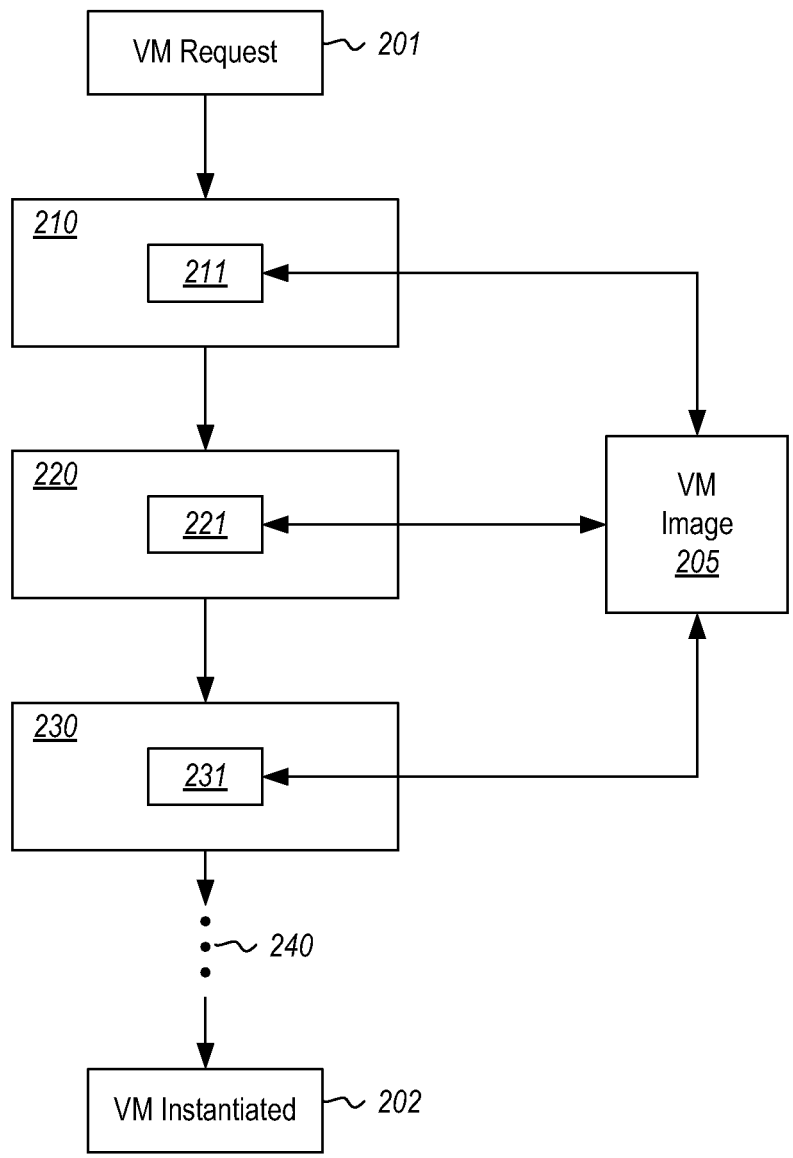
FIG. 2 illustrates a virtual machine operating platform in which multiple levels of a platform have access to and process a virtual machine image.

FIG. 2 illustrates a virtual machine operating platform 200 in which multiple levels of a platform have access to and process a virtual machine image. In this specific example, there are three illustrated levels 210, 220 and 230 in the platform, each performing some processing on the virtual machine image 205. Processing 211, 221 and 231 represents the processing on the virtual machine image 205 performed by each of the platform levels 210, 220 and 230, respectively. The ellipses 240 represent that there may be other numbers of levels within the platform from perhaps as few as two, to as many as enumerable, without departing from the principles described herein. Each of the levels 210, 220 and 230 may represent modules, components, or even entire computing systems, even distributed computing systems. Furthermore, each of the levels 210, 220 and 230 may perform automatic recovery which uses lease manipulation to ensure integrity of the virtual machine image 205.

The processing begins through the platform 200 with a request 201 for a virtual machine to be instantiated. For instance, a user might request a virtual machine having particular parameters, such as memory size, number of CPU cores, operating system, hard disk space, network bandwidth, and the like.

The first level 210 identifies the corresponding virtual machine image that can be used to spin up a virtual machine having the designated parameters. The first level 210 then performs the method 700 described with respect to FIG. 7. Specifically, the first level 210 acquires a write lease on the virtual machine image (act 701) so as to be owned by the first level 210, performs processing on the virtual machine image (act 702) using processing 211, and then passes the lease with a key to the next level (act 703).

One notable thing about the write lease is that it is exclusive in that the write lease can only have one owner at a time for a given virtual machine image, and only the owner of the lease can write to the virtual machine image. This prevents multiple levels in the platform 200 from being able to write to the virtual machine image 205 at any given time, thereby preventing corruption of the virtual machine image 205.

The second level 220 likewise performs the method 700, except that instead of acquiring the lease (act 701), the second level 220 changes the lease so as to be owned by the second level 220. This lease changing process may be performed by taking the handle to the previous lease provided by the first level 210 and using the key to obtain a new lease, or a renewed form of the old lease in which the first level 210 is no longer the owner. The second level 220 performs processing 221 on the virtual machine image (act 702), and then passes the lease with a key to the next level (act 703).

The third level 230 also performs the method 700, except that once again, instead of acquiring the lease (act 701), the third level 230 changes the lease so as to be owned by the third level 230. The third level 230 performs processing 231 on the virtual machine image 205 (act 702), and then passes the lease with a key to the next level (act 703). This continues until completion 202 of the virtual machine instantiation from the virtual machine image 205. The reverse process may also occur when the virtual machine corresponding to the virtual machine image is no longer needed on the host. When there is a request for virtual machine deletion, the lowest layer 230 reverts the lease back to the lease of the previous layer 220. This sequence continues until the virtual machine image ownership comes back to the customer.

Figure 3:
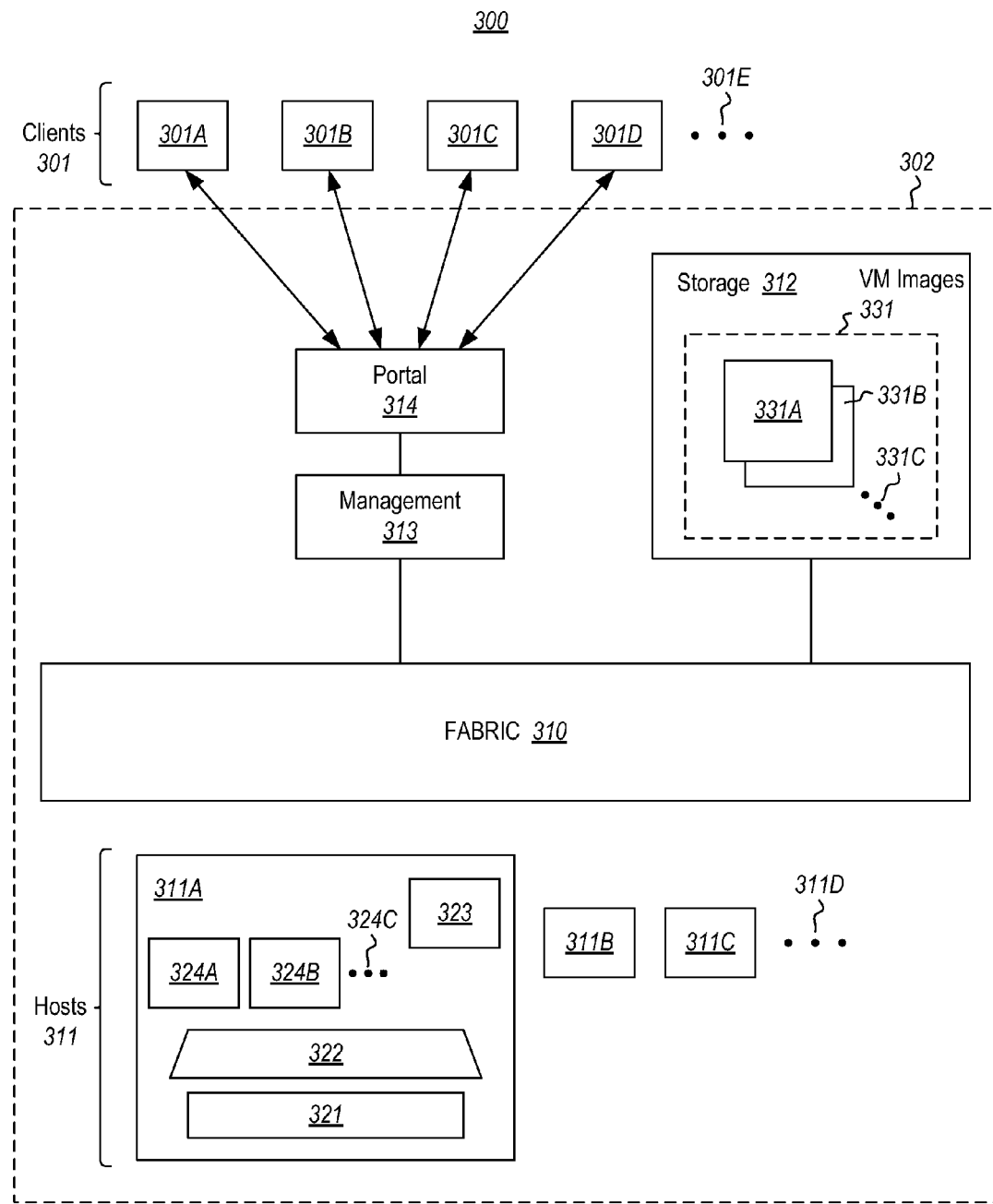
FIG. 3 illustrates an environment that includes multiple clients interacting with a system that may be used to instantiate and operate a virtual machine.

FIG. 3 illustrates an environment 300 that includes multiple clients 301 interacting with a system 302. The system 302 includes a specific example of the multi-level platform 200 of FIG. 2 in which the management service 313 represents the first level 210, the host fabric 310 represents the second level 220, and the host 311A represents the third level 230.

In the environment 300, multiple clients 301 are interacting with the system 302 using a portal 314. For instance, the clients 301 might be requesting virtual machines be spun up in the system 302 for use by the respective client, or for use by other clients. For instance, a user might request a virtual machine to use personally, or perhaps an administrator may request one or more virtual machines to be spun up for use by one or more other users. The clients 301 may each be structured as described above for the computing system 100 of FIG. 1.

In FIG. 3, there are only four clients illustrated including clients 301A, 301B, 301C, and 301D. However, as represented by the ellipses 301E, the principles described herein are not limited to the number of clients served by the system 302, and the set of clients being served may chance frequently, or even continuously. In one embodiment, the system 302 is a cloud computing environment, in which case the number of clients served may be quite numerous, and the system 302 may be distributed, perhaps even globally.

In this description and the following claims, "cloud computing" is defined as a model for enabling ubiquitous, convenient, on-demand network access to a shared pool of configurable computing resources (e.g., networks, servers, storage, applications, and services). The shared pool of configurable computing resources can be rapidly provisioned via virtualization and released with low management effort or service provider interaction, and then scaled accordingly. A cloud computing model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). In this description and in the claims, a "cloud computing environment" is an environment in which cloud computing is employed.

The system 302 also includes a host fabric 310 (or a service fabric) and a number of hosts 311. A host represents a physical machine capable of running multiple virtual machines. The host fabric makes the overall decision as to which host to run the virtual machine on and abstracts away the identity of the host so that the components above the level of the host fabric 310 (including the clients) need not be aware of the hosts 311, or the specific host on which the virtual machine runs. The host fabric 310 may, for example, manage the provisioning and lifecycle management of all resources in the system 302. A virtual machine may even be migrated from one host to another without components above the service fabric or the client being aware of the migration. The host fabric 310 may monitor performance of the hosts 311, track allocation and resource usages across the hosts, and act as a gateway to other services, such as storage service 312.

In the illustrated embodiment, the hosts 311 are illustrated as including three hosts 311A, 311B and 311C. However, the ellipses 311D represents that the host fabric 310 may interface with any number of hosts. The host 311A is abstractly illustrated as being larger than hosts 311B and 311C merely so that some of the typical contents of a host can be more clearly illustrated, though for simplicity, the contents of the hosts 311B and 311C are not illustrated.

Host 311A is illustrated as including physical resources 321. Such physical resources 321 might include, for example, non-volatile storage such as solid-state storage, mechanism storage, or the like. The physical resources 321 may also include memory, network interface cards having particular bandwidths, processing cores, and the like.

A hypervisor 322 resides above the physical resources 321 and serves a plurality of virtual machines 324 in the sense that the hypervisor 322 abstracts away the physical resources 321 from the virtual machines 321. Instead, the virtual machines 324 may each interface with the hypervisor 322, and the hypervisor 322 makes it appear to the virtual machine as though the virtual machine is interfacing with a physical resource. This conceptualization allows the hypervisor to offer up virtual resources to the virtual machine, such virtual resources supported by physical resources underneath the hypervisor, but which appear as distinct resources to the virtual machine. The hypervisor also ensures isolation between virtual machine operation such that one virtual machine is not tampering with resources used by another virtual machine. Each host also has a host agent 323 which interfaces with the host fabric 310 and performs other operations, such as host performance monitoring and reporting, virtual machine instantiation, and so forth, that are specific to a host.

In the illustrated example of the host 311A, there are two virtual machines 324 illustrated, virtual machine 324A and host 324B. However, the ellipses 324C represent that there may be any number of virtual machines 324 operating above the hypervisor 322. The only limit is really the capability of the hypervisor and the underlying physical resources to support the desired performances of the various virtual machines. If too many virtual machines are added to a single host machine, for example, performance may be deteriorated. The host fabric 310 is designed to avoid this situation, and even migrate virtual machines from one host to another to perform load balancing, perform automated service recovery from hardware or software failures, to accommodate resource requirement changes and/or to protect the performance of the hosts as a whole.

During operation, the virtual machines emulates a fully operational computing system including an at least an operating system, and perhaps one or more other applications as well. The virtual machine generates a desktop image or other rendering instructions that represent a current state of the desktop, and then transmits the image or instructions to the client for rendering of the desktop. As the user interacts with the desktop at the client, the user inputs are transmitted from the client to the virtual machine. The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the perspective of the user, it is as though the client computing system is itself performing the desktop processing.

The storage service 312 includes virtual machine images 331. In this illustrated example, the virtual machine images 311 include virtual machine images 331A and 331B, although the ellipses 331C represent that there may be any number of virtual machine images within the storage service 312. The virtual machine images define the initial state of the virtual machine including the operating system version of the virtual machine. In specialized virtual machine images, the virtual machine image is dedicated to a single instance of a virtual machine, and an operational virtual machine instance may be spun up directly from the virtual machine image. In that case, the virtual machine may write directly to the virtual machine image.

The storage service 312 may provide useful functions in order to improve the reliability and reduce the latency of the storage. For instance, the storage service 312 might replicate some of the data within the storage to be at different locations to reduce latency, and perhaps to guard against disaster. The storage service 312 also offers an exclusive write lease for each of the virtual machine images. The virtual machine images may be a pre-constructed virtual machine image available to multiple clients from different organizations, or may be a customer-specific virtual machine image that is provided by the customer.

Figure 4:
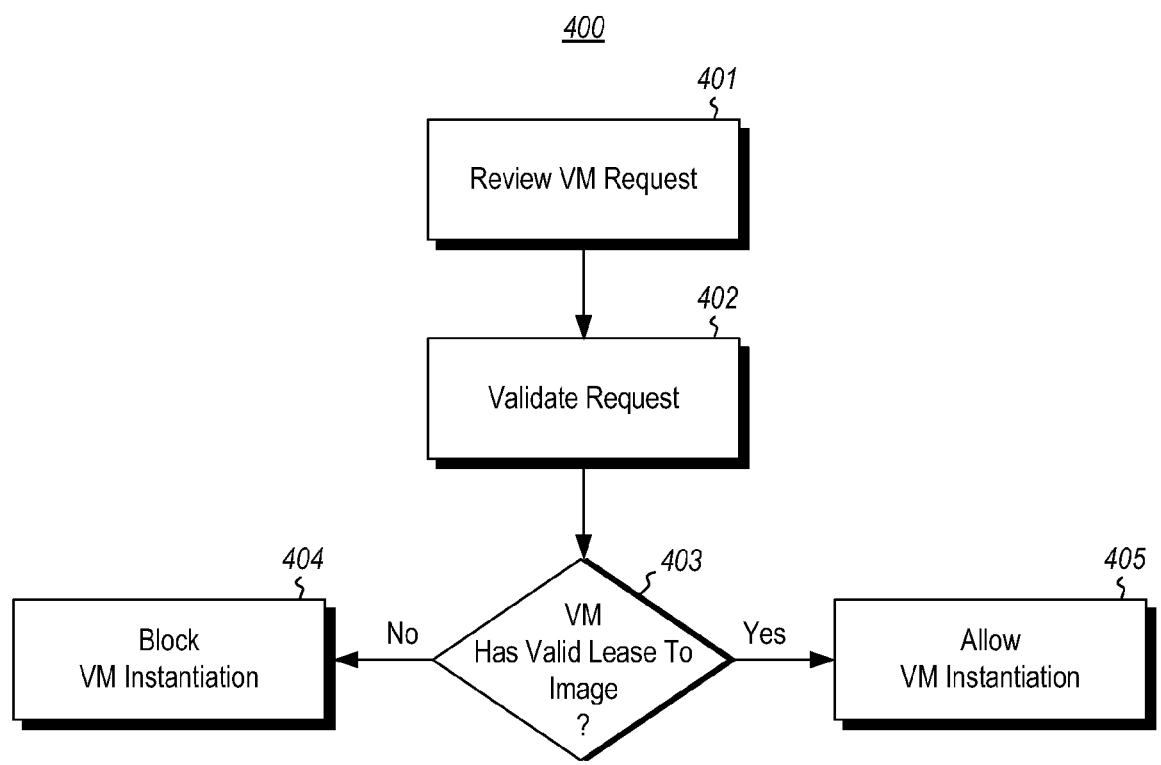
FIG. 4 illustrates a flowchart of a method for the host fabric to prevent or reduce the chance of there being multiple instances of the same virtual machine writing to a virtual machine image.

FIG. 4 illustrates a flowchart of a method 400 for the host fabric to prevent or reduce the chance of there being multiple instances of the same virtual machine operating on (specifically writing to) a virtual machine image. The host fabric 310 reviews requests to instantiate (or upgrade) a virtual machine from a virtual machine image (act 401). The host fabric 310 also verifies that the request is a valid request (act 402). It is then determined whether the virtual machine to be instantiated (or upgraded) has a valid lease on the virtual machine image (decision block 403).

If the virtual machine does have a valid lease (Yes in decision block 403), the host fabric 310 facilitates the instantiation or upgrading of the virtual machine from the virtual machine image (act 405) on the selected host. For instance, there may be some interaction between the host fabric 310 and the host agent 323 on the selected host 311A that causes the host agent to instantiate the virtual machine from the virtual machine image. As example, the host fabric 310 may create a configuration file that describes the virtual machine and provide that configuration file to the selected host. The host fabric 310 may issue a command to create the virtual machine as described in the configuration file. The host fabric 310 may issue a command to start the created virtual machine.

If the virtual machine does not have a valid lease (No in decision block 403), the virtual machine is blocked from instantiating or upgrading from the virtual machine image (act 404). For instance, the host fabric may abstain from issuing any of the commands that cause a selected host to instantiate the virtual machine from the virtual machine. By insisting that any virtual machine that is to be instantiate own the lease to the virtual machine image, this prevents a situation in which there may be multiple virtual machines operating on the same virtual machine image at the same time, causing corruption of the virtual machine image. This can happen, for example, during virtual machine migration across hosts during automatic service recovery or virtual machine resource configuration change. This might also occur if the host fabric were to experience a state loss of the fabric controller or backup state restoration.

The operation of the example system 302 will now be described. The clients 301 interact with the portal 314 in order to communicate a request to have a virtual machine instantiated (or upgraded) for use by a particular user. The portal 314 responds by communicating the request to the management service 313. The management service 313, being an example of the first level 210 of FIG. 2, responds by identifying the corresponding virtual machine image from which the virtual machine is to be created using the user-provided parameters. The management service 313 then acquires a lease on the selected virtual machine image (act 701) so that it is owned by the management service 313 and only the management service 313 can write to the selected virtual machine image. The management service 313 then performs any further processing on the virtual machine image (act 702), and then passes the lease and a key to the next level in the platform (act 703), which is the host fabric 310 in FIG. 3. As the host fabric 310 communicates directly with the storage service 312, and the storage service 312 provides the exclusive write lock for any given virtual machine image, any entity which acquires, renews, or re-acquires a lease, requests this through the host fabric 310 in the embodiment of FIG. 3.

Figure 5:
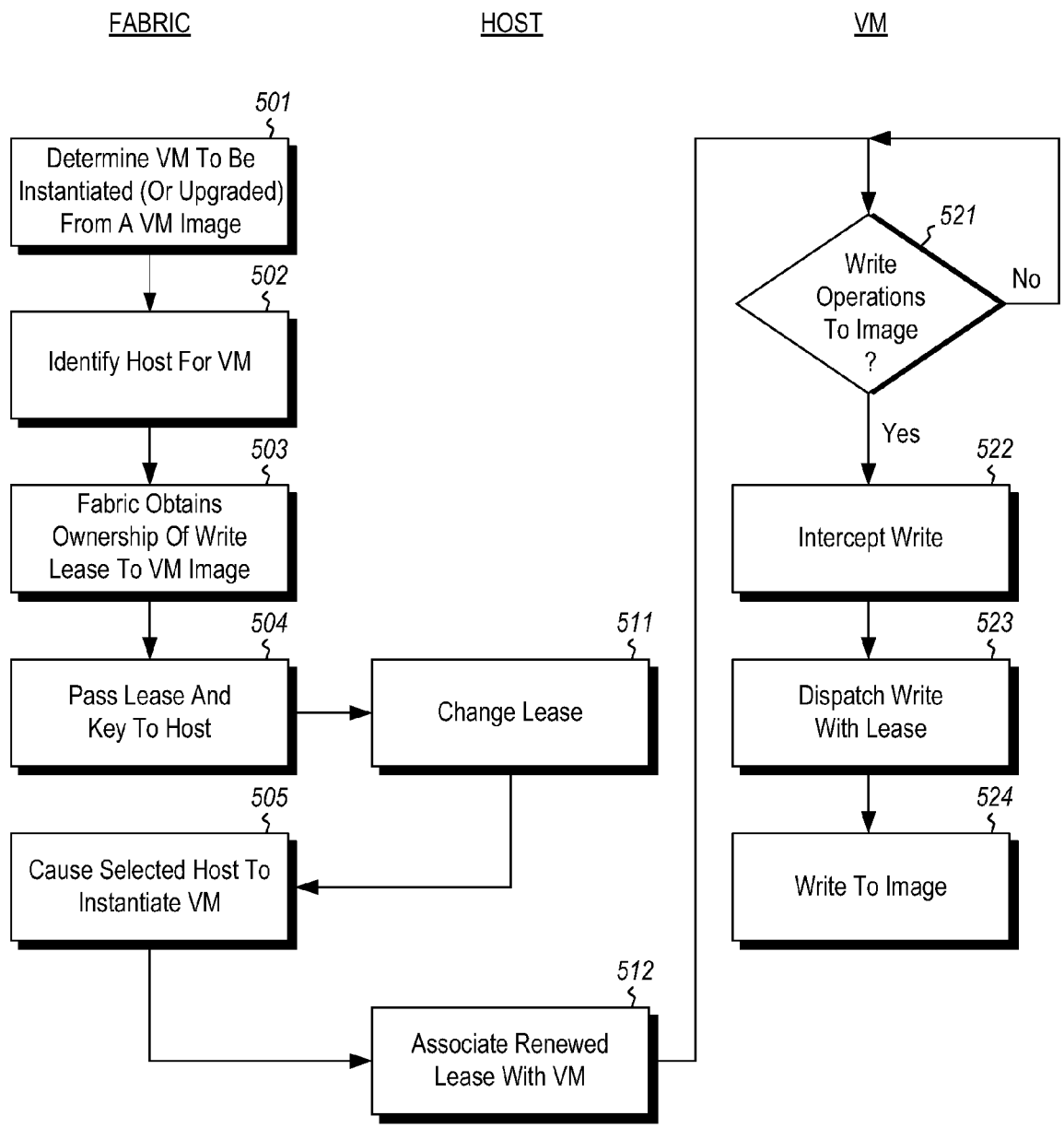
FIG. 5 illustrates a flowchart of a method for the host fabric to facilitate instantiation of a virtual machine from a virtual machine image.

The host fabric 310 then continues operation. FIG. 5 illustrates a flowchart of a method 500 for the host fabric to facilitate instantiation of a virtual machine from a virtual machine image. Some of the acts are performed by the host fabric as represented in the left column of FIG. 5 under the heading "FABRIC". Other acts of the method 500 are performed by the host as represented in the middle column of FIG. 5 under the heading "HOST". Others of the acts are performed by the virtual machine itself as represented in the right column of FIG. 5 under the heading "VM".

The host fabric 310 determines that a virtual machine is to be instantiated (or upgraded) from a virtual machine image (act 501). This determination may be made based on the receipt of the lease and key from the management service 312, as well as the receipt of other information specifying the parameters of the virtual machine to be created.

In response, the host fabric identifies one of the hosts 311 (hereinafter, the "selected host") on which the virtual machine is to be instantiated (act 502). In this example, suppose that the selected host is host 311A. The host fabric 310 then changes the write lease to the virtual machine image (act 503) so that the host fabric 310 obtains ownership of the write lease and becomes the only entity that can write to the selected virtual machine image. The changed lease may result in a new lease identifier that is known only to the host fabric. The host fabric 310 performs any other processing on the virtual machine image (act 702), and then passes the lease and a key to the virtual machine image to the selected host (act 504) (also act 703).

In one embodiment, the selected host 311A then changes the lease in response to receiving the lease and the key from the host fabric 310 (act 511) (also act 701) so that only the selected host agent has the capability to write to the selected virtual machine image. As mentioned already, the selected host 311A may use the services of the host fabric 310 in order to complete this lease renewal. In an alternative embodiment, however, the host 311A does not change the lease. Rather, the host 311A uses the lease passed from the host fabric 310. In that case, in response to any host failure, the host fabric 310 would change the lease (which is possible as the host fabric 310 retained ownership of the lease).

Thereafter, the host fabric 310 causes the selected host to instantiate and execute the virtual machine from the virtual machine image (act 505). The selected host then associates the renewed lease with the virtual machine (act 512) such that the virtual machine that is instantiated is the only entity, even on the selected host, that is capable of writing to the selected virtual machine image from which the virtual machine was created. Note that even if the same request to create a virtual machine is sent to another instance of the host fabric 310, the other host fabric controller will not be able to instantiate the virtual machine since the other host fabric instance does not own the write lease to the corresponding virtual machine image. Thus, the principles described herein provide reliable use of leases and independence of deployments of the host fabrics and the number of instances of host fabric controllers.

Thereafter, whenever the virtual machine performs a write operation to the virtual machine image (Yes in decision block 521), the write operation is intercepted (act 522) perhaps by a write driver present on the host 311A or in the hypervisor 322. The driver dispatches the write operation with the changed lease (act 523) so that the write operation is performed on the virtual machine image (act 524) in the storage service 312.

Figure 6:
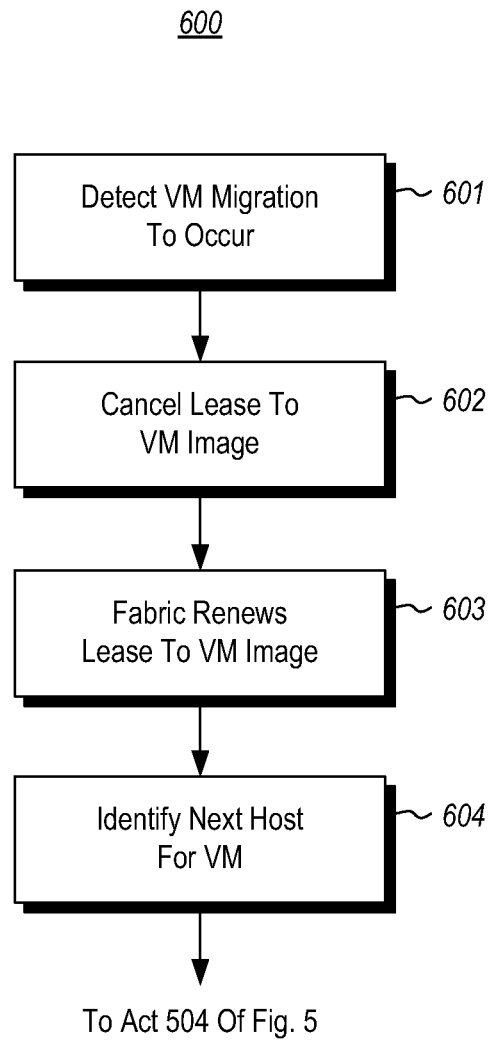
FIG. 6 illustrates a flowchart of a method for the system to migrate the virtual machine.
Figure 7:
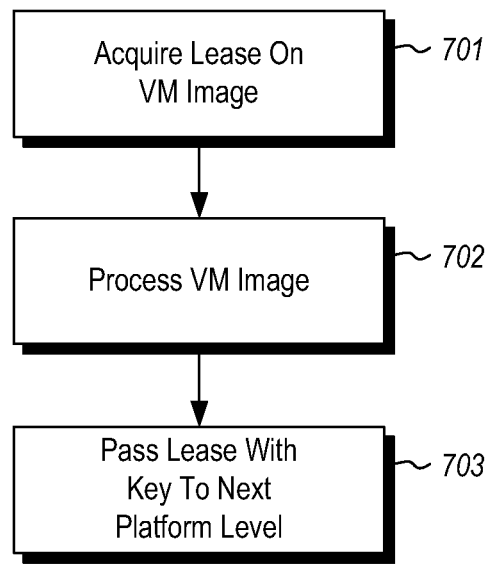
FIG. 7 illustrates a flowchart of a method performed by each of the multiple levels in a platform in between the time that a virtual machine request is received and the time that the virtual machine is instantiated.

One of the functions of the host fabric is to detect when migration of the virtual machine is to occur from one host to another. FIG. 6 illustrates a flowchart of a method 600 for the system to migrate the virtual machine. First, the host fabric 310 detects that the virtual machine should be migrated from the selected host to another host of the hosts (act 601). If migration is to occur, the host fabric 310 facilitates migration. There are any number of reasons why the host fabric may decide that migration is to occur.

A first example reason is that the host fabric receives an explicit migrate command. For instance, a high level administrator might issue such a command to test migration capabilities, or perhaps to move the virtual machine for legal or territorial reasons, or perhaps because one of the hosts is to be brought down. Another reason for such a migrate command would be to facilitate defragmentation of the virtual machine cluster represented on the host.

As another example, the host fabric may determine that migration should occur in response to receiving a changed resource specification for the virtual machine (also called herein a changed resource requirement); and thereby determined that the changed resource specification warrants migration. For instance, if the virtual machine specification is changed from 2 processor cores to 16 processor cores, there might not be enough capability on the current host to allow the greater physical resources requested, thus warranting migration to a host with these capabilities.

As a third example, the host fabric may determine that the virtual machine should be migrated from the selected host to another host in response to detecting a diminished performance of the selected host.

As a fourth example, perhaps the host fabric determines that the virtual machine should be migrated from the selected host to another host in response to performing load balancing.

As other examples, migration may occur during an automated service recovery, or if the host fabric controller loses its state and gets restored from backup. The fabric controller state can use the principles described herein to have virtual machine configuration and location that is different than the latest state, with the lease mechanism preventing this difference from breaking the virtual machine.

The migration might also occur to perform a backup restore. In this case the host fabric renews the lease for a given virtual machine to lease L1 and instantiates the virtual machine in host A. Then, the host fabric migrates the virtual machine to host B and renews the lease to L2. Then, the host fabric fails and loses its state along with the most recent lease L2. The fabric gets restored from the backup and tries to instantiate the virtual on host A, which would fail since the virtual is running on host B with lease L2. This protects the VM image from being rewritten with some older state in case of fabric failure.

In any case, in response to determining that the virtual machine should be migrated from the selected host, the host fabric 310 reverts the lease to the virtual machine image to the original form as passed from the management service 313 owned by the selected host (act 602), and again changes the lease to the virtual machine image so as to be owned by the host fabric (act 603). The reverting and changing of the lease (acts 602 and 603) may perhaps even be performed atomically. The host fabric 310 then identifies another of the hosts 311, a next selected host, on which the virtual machine is to be instantiated (act 604). For instance, perhaps the host fabric 310 selects that the virtual machine 324A is to be migrated from the host 311A to the host 311B. Processing then proceeds to act 504 of FIG. 5 from which the virtual machine is instantiated on the next host.

Accordingly, the principles described herein allow for effective management of virtual machines in a manner that multiple instances of the virtual machine do not operate on the virtual machine image at the same time. Thus, virtual machine image corruption is prevented, or at least the risk is reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a virtual computing environment that includes one or more client computing systems which use one or more virtual machines to access computing resources and services provided by one or more hosts running the one or more virtual machines, a multi-layer platform system for accessing one or more virtual images used by the one or more virtual machines in a manner that prevents or eliminates multiple instances of the same virtual machine image from being written to by more than a single entity at any given instance, the multi-layer platform comprising:

a storage component storing one or more virtual machine images each of which defines an initial state of a virtual machine, and the storage component also storing an exclusive write lease for each of the stored virtual machine images;

a portal through which one or more client computing systems request access to one or more virtual machines;

a first layer of the multi-layer platform, comprising a management component which receives from the portal the one or more client computing system requests for access to one or more virtual machines, the management component then identifying a corresponding virtual machine image that defines a corresponding initial state of a virtual machine matching at least one of the requests;

acquiring from the storage component an exclusive write lease for the identified virtual machine image, the exclusive write lease permitting only the management component to write to the identified virtual machine image so long as the management component retains the exclusive write lease; and after performing any processing on the identified virtual machine image, passing the exclusive write lease with a first key to a next layer in the multi-layer platform;

the next layer comprising a second layer of the multi-layer platform, which comprises a fabric component which then receives the exclusive write lease and the first key from the management component;

communicates with the storage component and obtains exclusive ownership of the exclusive write lease so that only the fabric component is able to write to the identified virtual machine image so long as the fabric component retains the exclusive write lease;

determines at least one host having access to physical resources of one or more physical computing systems, the physical resources used by a virtual machine that is to be instantiated or upgraded at the determined host based on the identified virtual machine image; and after performing any processing on the identified virtual machine image, passing the exclusive write lease with a second key to a further layer in the multi-layer platform;

the further layer comprising a third layer of the multi-layer platform, which comprises the determined at least one host, and the at least one host then receiving the exclusive write lease and the second key from the fabric component and obtaining exclusive ownership of the exclusive write lease;

instantiating a virtual machine based on the identified virtual machine image; and associating the exclusive write lease with the instantiated virtual machine so that the instantiated virtual machine is the only entity, even on the determined host, that can write to the identified virtual machine image.

2. The system of claim 1, wherein the third layer comprises a plurality of hosts each having access to physical resources of physical computing systems, and each host further comprises a hypervisor, and a host agent that causes a plurality of virtual machines to operate above the hypervisor so as to be abstracted from the physical resources.

3. The system of claim 2, wherein the fabric component is configured to:

review a request to instantiate or upgrade a virtual machine from a virtual machine image;

determine whether the virtual machine to be instantiated has a valid lease on the virtual machine image; and if the request does not have a valid exclusive write lease, block the virtual machine from instantiating or upgrading from the virtual machine image, and if the request does have a valid exclusive write lease, facilitate the instantiation or upgrading of the virtual machine from the virtual machine image.

4. In a virtual computing environment that includes one or more client computing systems which use one or more virtual machines to access computing resources and services provided by one or more hosts running the one or more virtual machines, a computer-implemented method for managing a multi-layer platform for accessing one or more virtual images used by the one or more virtual machines in a manner that prevents or eliminates multiple instances of the same virtual machine image from being written to by more than a single entity at any given instance, the computer-implemented method comprising:

storing one or more virtual machine images each of which defines an initial state of a virtual machine, and also storing an exclusive write lease for each of the stored virtual machine images;

receiving at a portal one or more client computing system requests for access to one or more virtual machines;

at a first management layer of a multi-layer platform, receiving from the portal the one or more client computing system requests for access to one or more virtual machines, the first management layer then identifying a corresponding virtual machine image that defines a corresponding initial state of a virtual machine matching at least one of the requests;

acquiring an exclusive write lease for the identified virtual machine image, the exclusive write lease permitting only the first management layer to write to the identified virtual machine image so long as the first management layer retains the exclusive write lease; and after performing any processing on the identified virtual machine image, passing the exclusive write lease with a first key to a second fabric layer in the multi-layer platform;

at the second fabric layer of the multi-layer platform, receiving the exclusive write lease and the first key and obtaining exclusive ownership of the exclusive write lease, then determining at least one host having access to physical resources of one or more physical computing systems, the physical resources used by a virtual machine that is to be instantiated or upgraded at the determined host based on the identified virtual machine image; and after performing any processing on the identified virtual machine image, passing the exclusive write lease with a second key to a third host layer in the multi-layer platform;

the third host layer comprising the determined at least one host, and the at least one host then receiving the exclusive write lease and the second key from the second fabric layer and obtaining exclusive ownership of the exclusive write lease;

instantiating a virtual machine based on the identified virtual machine image; and associating the exclusive write lease with the instantiated virtual machine so that the instantiated virtual machine is the only entity, even on the determined host, that can write to the identified virtual machine image.

5. The computer-implemented method of claim 4, wherein the third host layer comprises a plurality of hosts each having access to physical resources of physical computing systems, and each host further comprises a hypervisor, and a host agent that causes a plurality of virtual machines to operate above the hypervisor so as to be abstracted from the physical resources.

6. The computer-implemented method of claim 5, wherein the second fabric layer is configured to:

review a request to instantiate or upgrade a virtual machine from a virtual machine image;

determine whether the virtual machine to be instantiated has a valid lease on the virtual machine image; and if the request does not have a valid exclusive write lease, block the virtual machine from instantiating or upgrading from the virtual machine image, and if the request does have a valid exclusive write lease, facilitate the instantiation or upgrading of the virtual machine from the virtual machine image.

7. The computer-implemented method of claim 5, wherein the second fabric layer abstracts away the identity of each host so that client computing systems are not aware of any specific host or hosts which are running virtual machines on behalf of such client computing systems.

8. The computer implemented method of claim 5, wherein the each hypervisor ensures isolation between virtual machine operations to prevent one virtual machine form tampering with resources used by another virtual machine.

9. The computer-implemented method of claim 5, wherein the second fabric layer is configured to migrate virtual machines from one host to another to perform load balancing, automated service recovery from hardware or software failures, or to accommodate resource requirement changes.

10. The computer-implemented method of claim 4, wherein the identified corresponding virtual image is based on parameters included in a request from a client computing system.

11. The computer-implemented method of claim 4, wherein the determined at least one host obtains exclusive ownership of the exclusive write lease by changing the lease in response to receiving the exclusive write lease and second key from the second fabric layer.

12. The computer-implemented method of claim 4, wherein the determined at least one host obtains exclusive ownership of the exclusive write lease by using the exclusive lease received from the second fabric layer without changing the exclusive write lease.

13. The computer-implemented method of claim 4, wherein the instantiated virtual machine is no longer needed, which then results in the exclusive write lease being reverted from the third host layer back to the second fabric layer, and then from the second fabric layer back to the first management layer.

14. In a virtual computing environment that includes one or more client computing systems which use one or more virtual machines to access computing resources and services provided by one or more hosts running the one or more virtual machines, a computer program product comprising one or more hardware storage devices containing executable instructions which, when implemented on one or more processors, causes the processor to implement a method for managing a multi-layer platform for accessing one or more virtual images used by the one or more virtual machines in a manner that prevents or eliminates multiple instances of the same virtual machine image from being written to by more than a single entity at any given instance, the method comprising:

storing one or more virtual machine images each of which defines an initial state of a virtual machine, and also storing an exclusive write lease for each of the stored virtual machine images;

receiving at a portal one or more client computing system requests for access to one or more virtual machines;

at a first management layer of a multi-layer platform, receiving from the portal the one or more client computing system requests for access to one or more virtual machines, the first management layer then identifying a corresponding virtual machine image that defines a corresponding initial state of a virtual machine matching at least one of the requests;

acquiring an exclusive write lease for the identified virtual machine image, the exclusive write lease permitting only the first management layer to write to the identified virtual machine image so long as the first management layer retains the exclusive write lease; and after performing any processing on the identified virtual machine image, passing the exclusive write lease with a first key to a second fabric layer in the multi-layer platform;

at the second fabric layer of the multi-layer platform, receiving the exclusive write lease and the first key and obtaining exclusive ownership of the exclusive write lease, then determining at least one system having access to physical resources of one or more physical computing systems, the physical resources used by a virtual machine that is to be instantiated or upgraded at the determined host based on the identified virtual machine image; and after performing any processing on the identified virtual machine image, passing the exclusive write lease with a second key to a third host layer in the multi-layer platform;

the third host layer comprising the determined at least one host, and the at least one host then receiving the exclusive write lease and the second key from the second fabric layer and obtaining exclusive ownership of the exclusive write lease;

instantiating a virtual machine based on the identified virtual machine image; and associating the exclusive write lease with the instantiated virtual machine so that the instantiated virtual machine is the only entity, even on the determined host, that can write to the identified virtual machine image.

15. The method of claim 14, wherein the third host layer comprises a plurality of hosts each having access to physical resources of physical computing systems, and each host further comprises a hypervisor, and a host agent that causes a plurality of virtual machines to operate above the hypervisor so as to be abstracted from the physical resources.

16. The method of claim 15, wherein the second fabric layer is configured to:

review a request to instantiate or upgrade a virtual machine from a virtual machine image;

determine whether the virtual machine to be instantiated has a valid lease on the virtual machine image; and if the request does not have a valid exclusive write lease, block the virtual machine from instantiating or upgrading from the virtual machine image, and if the request does have a valid exclusive write lease, facilitate the instantiation or upgrading of the virtual machine from the virtual machine image.

17. The method of claim 15, wherein the second fabric layer abstracts away the identity of each host so that client computing systems are not aware of any specific host or hosts which are running virtual machines on behalf of such client computing systems.

18. The computer implemented method of claim 15, wherein the each hypervisor ensures isolation between virtual machine operations to prevent one virtual machine form tampering with resources used by another virtual machine.

19. The method of claim 15, wherein the second fabric layer is configured to migrate virtual machines from one host to another to perform load balancing, automated service recovery from hardware or software failures, or to accommodate resource requirement changes.

20. The method of claim 14, wherein the identified corresponding virtual image is based on parameters included in a request from a client computing system.

21. The method of claim 14, wherein the determined at least one host obtains exclusive ownership of the exclusive write lease by changing the lease in response to receiving the exclusive write lease and second key from the second fabric layer.

22. The method of claim 14, wherein the determined at least one host obtains exclusive ownership of the exclusive write lease by using the exclusive lease received from the second fabric layer without changing the exclusive write lease.

23. The method of claim 14, wherein the instantiated virtual machine is no longer needed, which then results in the exclusive write lease being reverted from the third host layer back to the second fabric layer, and then from the second fabric layer back to the first management layer.

\* \* \* \* \*